UNITED STATES PATENT OFFICE.

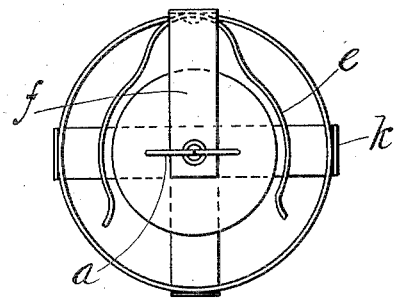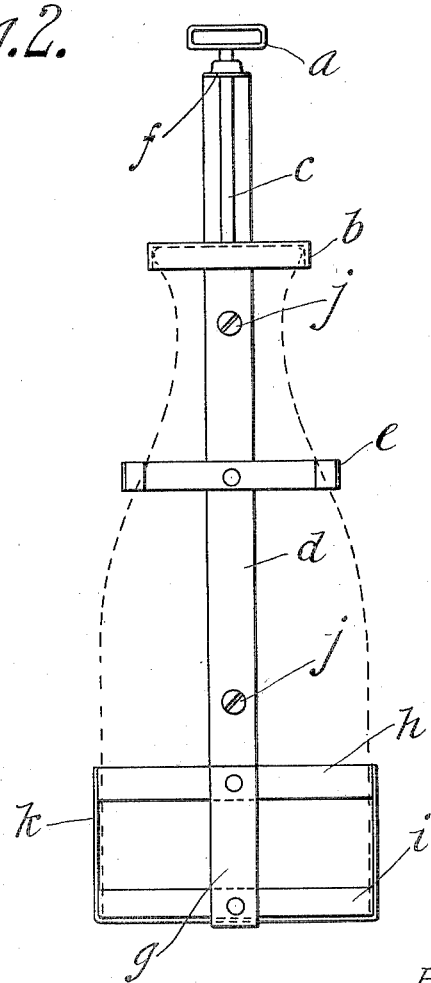

HENRY D. SARGENT, OF WORCESTER, MASSACHUSETTS, ASSIGNOR TO ARTHUR H. PARKER, OF WORCESTER, MASSACHUSETTS.

MILK-BOTTLE HOLDER.

1,098,765.  Specification of Letters Patent.  Patented June 2, 1914.

Application filed November 22, 1912. Serial No. 732,859.

*To all whom it may concern:*

Be it known that I, HENRY D. SARGENT, a citizen of the United States of America, residing at Worcester, in the county of Worcester and State of Massachusetts, have invented new and useful Improvements in Milk-Bottle Holders, of which the following is a specification.

This invention relates to a device for supporting a milk bottle and protecting the same from dogs, cats, flies or other contaminating influences.

With the ordinary paper disk which, at the present day, is most widely used for covering the end of the milk bottle, it has been customary to leave milk bottles delivered at a house resting on the floor of the porch or any convenient location. Frequently a small amount of the milk remains around the edge of the paper disk cover and this milk attracts dogs, cats and flies. Animals thus attracted to the milk bottle not only come in contact with the outlet of the bottle rendering the same unclean but they are also liable to tip the bottle over and break it.

The object of this invention is to so support the bottle that it cannot be reached by any of the undesirable influences mentioned and to provide a device which is conveniently used by the milk man as well as the house-holder.

With this object in view the invention consists in the structure disclosed in the accompanying drawings in which,—

Figure 1 is a plan view of the apparatus. Fig. 2 is a front elevation thereof with a milk bottle shown dotted in place.

The structure comprises a vertically arranged frame-piece $d$ made of flat sheet metal bent into the form shown. The lower horizontal bend of the frame-piece $d$ extends a distance about equal to the diameter of the bottle and then turns upwardly into the portion $g$ to provide a retaining means for the bottle. Horizontal retaining rings $h$ and $i$ are fastened to the portions $d$ and $g$, as shown in Fig. 2. A U-shaped supporting piece $k$ at right angles to portion $d$ is bent into position to embrace the portions $h$ and $i$ to which it is fastened as well as to the portion $d$. By this structure the lower end of the bottle when placed in the device is suitably supported. About mid-way of the frame-piece $d$ an open ended spring fork member $e$ is fastened. The upper end of the frame-piece $d$ is bent over horizontally into the portion $f$ and through this portion a rod $c$ is loosely mounted. This rod $c$ has at its upper end a convenient handle portion $a$ and at its lower end an inverted cup-shaped member $b$.

The apparatus is used as follows: The frame-piece $d$ is fastened, by means of screws $j$—$j$, against the side of a wall above the floor at about the point where the milk is usually delivered. In delivering the milk, the milk man places the upper end of the bottle under the cup-shaped member $b$ and pushing upwardly carries this cup-shaped member and rod $c$ a sufficient distance to allow the bottom of the bottle to swing over into the opening of the embracing members $h$, $i$, $g$ and $k$, whereupon the bottle is allowed to enter the embracing members and rest on the horizontal bottom of the members $d$ and $k$. At the same time the middle portion of the bottle snaps in the fork-shaped spring member $e$, and the cup-shaped member $b$ and the rod $c$ fall as the bottle is lowered and the former keeps the opening of the bottle covered in the manner illustrated in Fig. 2. With the bottle in this position at a certain distance above the ground or floor it is clear that neither flies, dogs, or cats can reach the opening of the bottle for the cup-shaped member $b$ amply protects the same. Nor can the bottle be tipped over in any manner, but remains fixed in position until the house-holder desires to use it.

The bottle can be removed from the device described by lifting the bottle vertically and swinging it out.

It will be seen that both in inserting the bottle and in removing the same from the device described, the user does not need to touch the device in any way, it only being necessary to grasp the bottle of milk in one hand, hold it at a slight angle to the vertical, and give it an upward and downward movement, at the same time turning the bottle to a vertical position to insert it in the device while an upward and outward movement is used in taking the bottle out of the device. This manner of manipulation renders the device nearly as convenient for the milk man as it is to set the bottles on the steps since the operation is performed by one hand holding the bottle.

What I claim, is:—

An apparatus for protecting milk bottles and the like comprising a J-shaped frame-piece having a horizontal upper extension in which a rod is yieldingly mounted for limited vertical movement about in line with the middle point of the lower horizontal extension, a covering cap mounted in the lower end of said rod, a U-shaped piece fastened at its center at right angles to said lower extension and extending upwardly a vertical distance about equal to the short vertical extension of the J-shaped piece, and horizontal embracing members fastened to and coöperating with said frame-pieces to support and prevent the bottle from tipping, all constructed and arranged so that the top of the bottle can be inserted under said cap and the base of the bottle within said embracing members, all in the manner and for the purpose described.

HENRY D. SARGENT.

Witnesses:
WILLIAM FRANCIS HASKINS,
EDWARD B. HINES.